United States Patent [19]

Nanba et al.

[11] 4,167,315
[45] Sep. 11, 1979

[54] APPARATUS FOR DATING CAMERA FILM

[75] Inventors: Yasuhiro Nanba, Osaka; Norio Beppu, Sennan; Seiji Yamada, Sakai, all of Japan

[73] Assignee: Minolta Camera Kabushiki Kaisha, Osaka, Japan

[21] Appl. No.: 819,009

[22] Filed: Jul. 26, 1977

[30] Foreign Application Priority Data

Aug. 3, 1976 [JP] Japan .................... 51-92960

[51] Int. Cl.² ............................................ G03B 17/24
[52] U.S. Cl. .................................. 354/106; 354/23 D
[58] Field of Search ................. 354/23 D, 105, 106, 354/109; 58/23 R, 50 R, 58, 4 A, 23 BA; 355/40

[56] References Cited

U.S. PATENT DOCUMENTS

| | | |
|---|---|---|
| 3,882,512 | 5/1975 | Lawrence et al. ............ 354/109 |
| 3,937,002 | 2/1976 | Van Haaften ............... 58/23 BA |
| 3,953,868 | 4/1976 | Kawamura et al. ........... 354/109 |
| 3,995,289 | 11/1976 | Shono ....................... 354/109 |
| 3,996,593 | 12/1976 | Uno et al. .................. 354/53 X |
| 4,025,931 | 5/1977 | Taguchi et al. .............. 354/105 |
| 4,034,550 | 7/1977 | Kouchi et al. ............... 58/50 R |
| 4,053,909 | 10/1977 | Shinoda et al. .............. 354/105 |

Primary Examiner—Michael L. Gellner
Attorney, Agent, or Firm—Watson, Cole, Grindle & Watson

[57] ABSTRACT

Dating information is applied to camera film from date information displaying circuitry which receives decoded electronic time signals generated by a chronometer. A first power source energizes the chronometer and a second power source energizes the decoder and display circuitry and other components such as the exposure control circuit. A monitor is provided to enable the camera operator to observe the date information. Manually operable switches are provided to independently actuate the dating apparatus and the exposure control circuit as well as to independently operate the display circuitry and the monitor.

In a modified embodiment, logic and switching circuitry are provided to monitor and date either exposure data obtained from a light measuring circuit and analog/digital converter or the date information generated by the chronometer. A manually independently operable switch for actuating the display circuitry is ganged with the switching circuit to expose the date information on the film. Another switch ganged with the switching circuit enables the date information to be monitored.

The display circuitry includes switches enabling the date information to be monitored independently of dating the film. One switch is actuated in timed relation with the shutter operation and manual closure of a second switch and opening of a third switch effects dating of the camera film.

18 Claims, 9 Drawing Figures

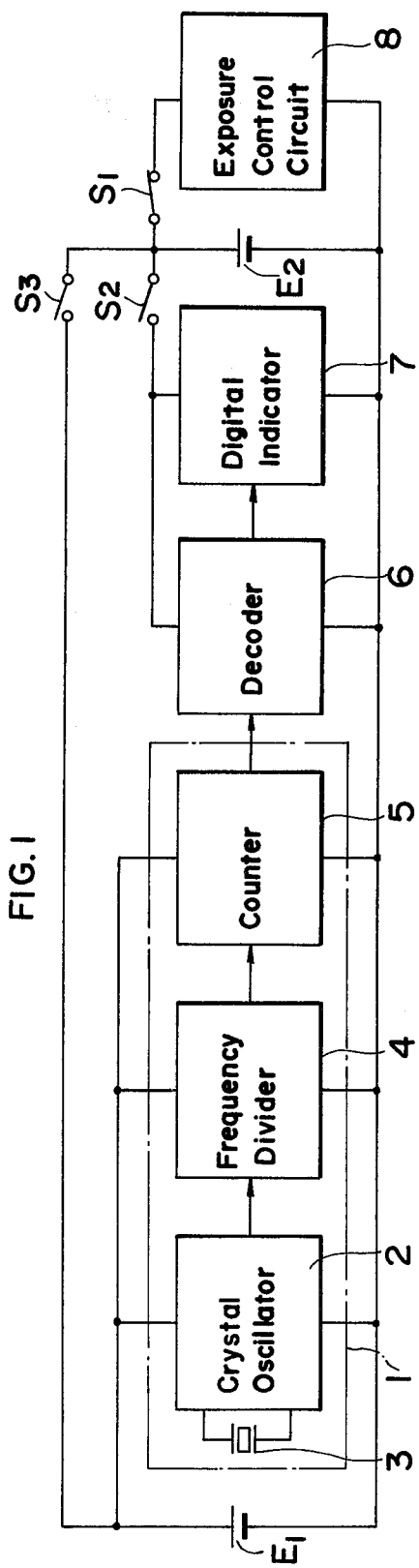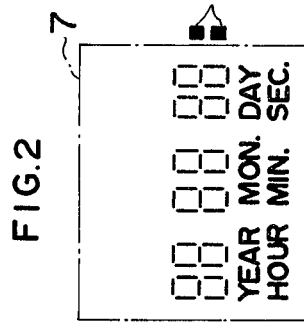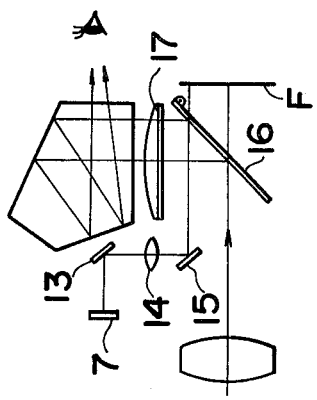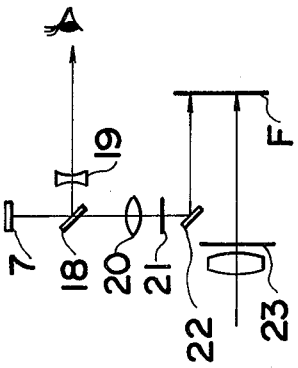

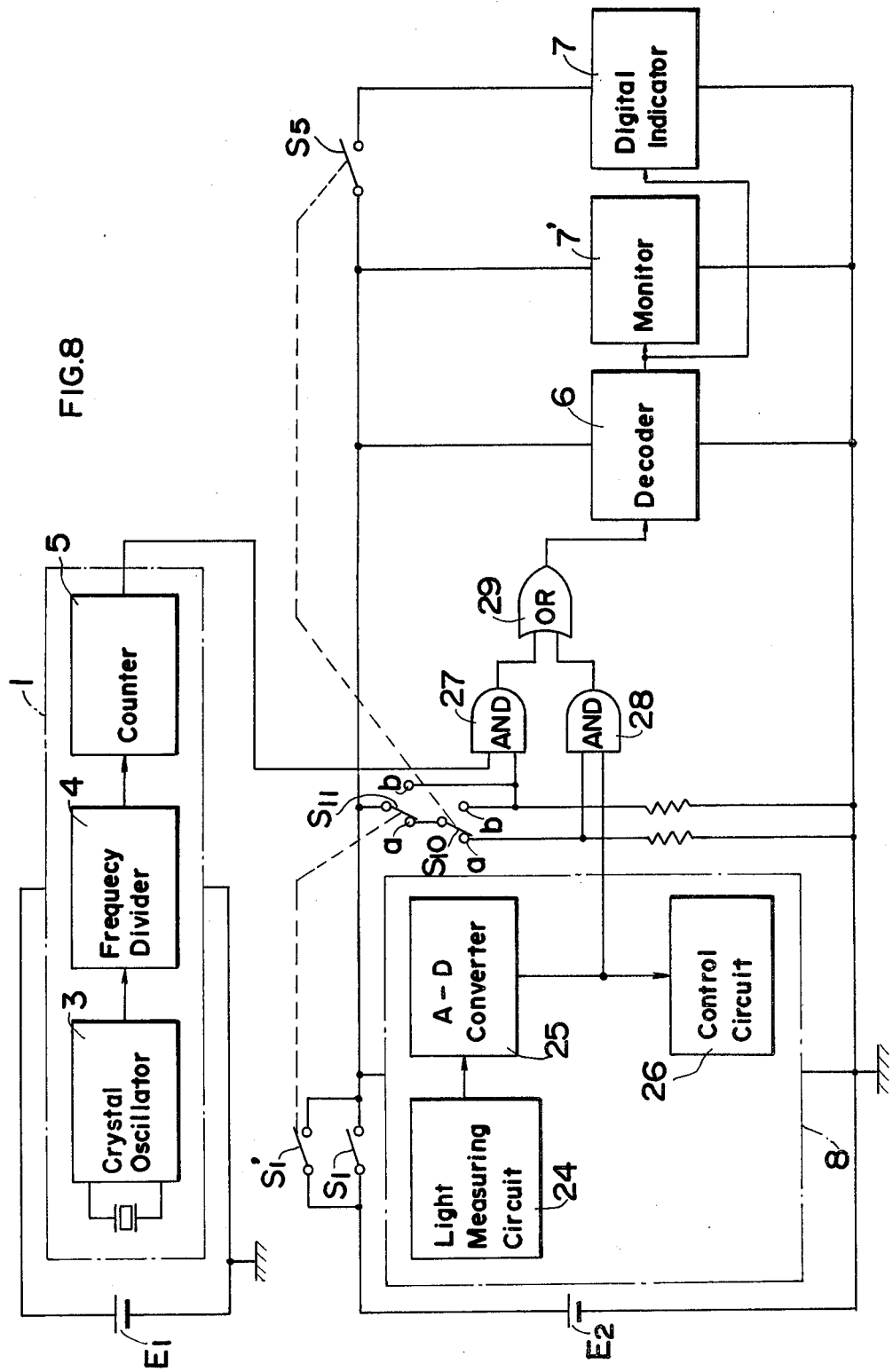

APPARATUS FOR DATING CAMERA FILM

BACKGROUND OF THE INVENTION

1. Field of the Invention

This invention relates to dating devices for a camera, and more particularly to such devices adapted to include calendar and other data in pictures.

2. Prior Art

In the conventional camera dating devices, the calendar and/or other data are manually set, which sometimes results in inadvertent failure to set the dating information or in the actual mis-setting of such information.

SUMMARY OF THE INVENTION

It is a primary object of this invention to provide improved camera dating devices to minimize such errors.

In accordance with the invention, a dating device including a chronometer is built into the camera so that the desired calendar and/or other data may be supplied by the chronometer and photographed on the film. More particularly, the camera data-photographing device includes an independent power source for driving the time-keeping means or chronometer. Another power source is connectable with the indicator means controlled by the time-keeping means only at the time of photographing the data into the picture. The chronometer drive power source is maintained in constant electrical connection with the time-keeping means.

With respect to the chronometer, it is advantageous to employ a crystal clock comprising a crystal oscillator, a frequency divider and counters. At the current technological level, such a crystal clock is the most practical chronometric contrivance that can be suitably built into a camera due to its high accuracy, dependability, adaptability to a compact design, and minimal power consumption.

BRIEF DESCRIPTION OF THE DRAWINGS

FIG. 1 is an overall block diagram of an embodiment of the invention;

FIG. 2 is a front view showing an example of data indication;

FIGS. 3 to 5 are side views of various embodiments illustrating the layout of projection indicator elements;

FIG. 8 is an overall block diagram of another embodiment of this invention; and

DESCRIPTION OF THE PREFERRED EMBODIMENTS

Figure 6:
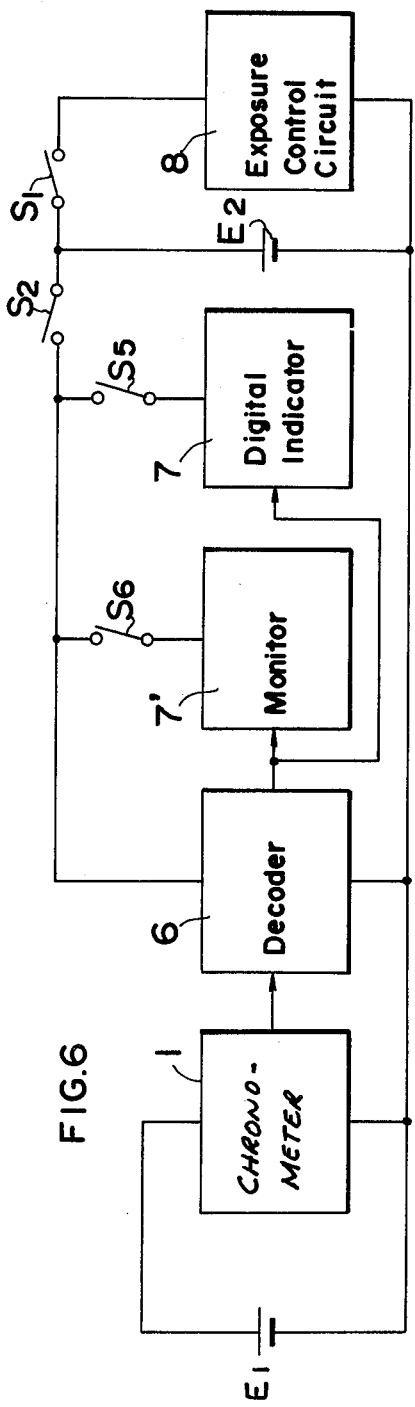
FIG. 6 is a block diagram of the circuitry suitable for use with the projection embodiment of FIG. 3.

In FIG. 1, the chain-line block represents crystal clock 1 exclusive of the indicating means, which constantly receives a supply of current from an exclusive power source E1. Crystal clock 1 is composed of crystal oscillator 2 and crystal resonator 3. Frequency divider 4, assuming that the oscillation frequency of crystal oscillator 2 is 32.768KHZ, divides that frequency by one 32768th to obtain clock pulses with a period of 1 second. Counter 5 counts the 1 second period pulses and converts the counted pulses into signals corresponding to the year, month and date (or the hour, minute and second). The power consumption of crystal clock 1 is very small. Decoder 6 converts signals from counter 5 into signals forms suitable for digital indications and controls digital indicator 7. Digital indicator 7 comprises a seven-segment type photoelectric indicator for indicating numerals and such photoelectric indications are projected and focussed onto the photographic film to consummate the dating of the picture. The power consumed by decoder 6 and digital indicator 7 is considerably greater than the power consumption of crystal clock 1. Exposure control circuit 8, together with decoder 6 and digital indicator 7, receives a supply of current from power source E2 through switch S1 which is closed at the time of shutter release. Switch S2 is closed to initiate dating. Auxiliary switch S3 is adapted to provide an emergency supply of current from either one of power sources E1 and E2 when the other source has become ineffectual. Auxiliary switch S3 remains open when both power sources E1, E2 are functioning properly but, when either one of the sources fails or becomes unavailable, the cells are removed and auxiliary switch S3 is closed.

FIG. 2 illustrates an exemplary dating display 7, i.e., a visual indication of the year, month and day (or hour, minute and second) by the seven-segment indicating elements, which are either photoelectric diodes or liquid crystals. If liquid crystals, which do not emit light spontaneously, are employed a separate light source must be provided. Reference numeral 10 represents elements which go on and off at an interval of, say, a second. Elements 10 are made to flicker when the data is monitored through the viewfinder and are deactuated during the time of dating the film, so that the photographer may determine if the time-keeping action is normal or not.

FIGS. 3 through 5 show the positioning of indicator element 7 within the projection mechanism of the photographic camera. FIG. 3 shows the position of indicator element 7 in a single-lens-reflex camera for dating film F which is located in front of the indicator element. So that the data may be monitored through the viewfinder, seven-segment monitoring indicator element 7' is disposed adjacent the bottom of pentaprism 11.

FIG. 6 illustrates an exemplary emission control circuit for indicator element 7 and monitoring element 7'. Manually operable switch S2 is closed for inserting dating information into monitor 7' and digital indicator 7, manually operable switch S6 is closed when it is desired to check the data in the viewfinder, and synchro-switch S5 is closed every time an exposure is made.

Figure 7:
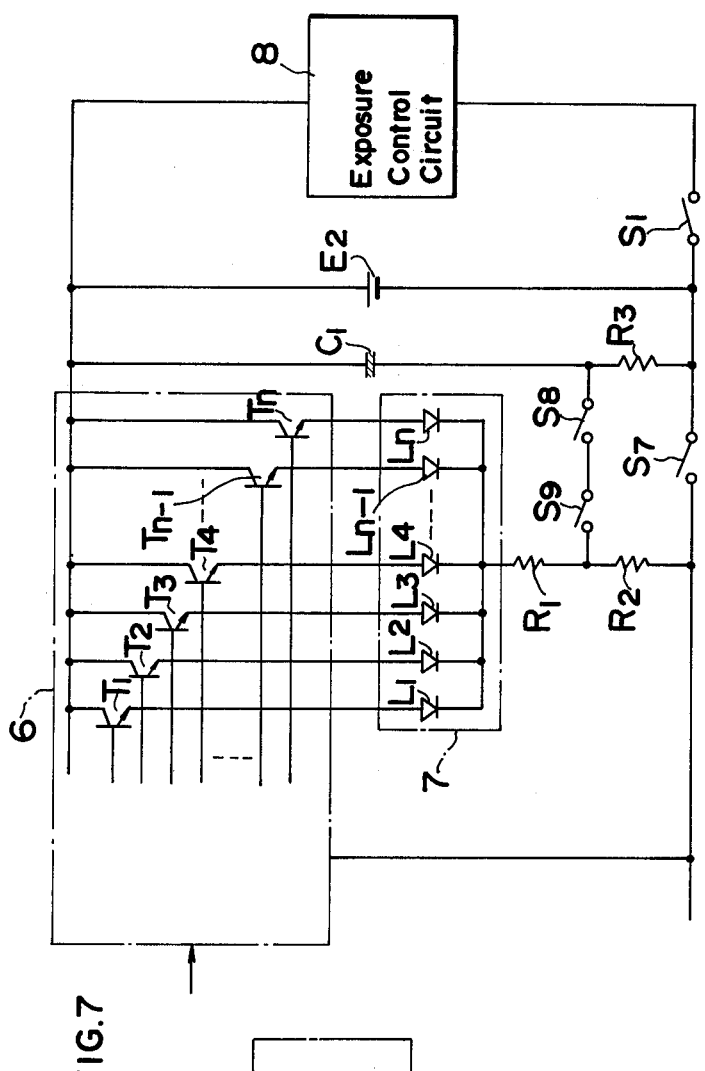
FIG. 7 is a block diagram of the circuitry suitable for use with the projection embodiment of FIG. 4.

FIG. 4 shows a projection arrangement where the emission of light from data-indicating element 7 can be directly monitored by the eye through the viewfinder. Thus, the indication by data-indicating element 7 is reflected downwardly by mirror 13 and projected onto film F by mirror 15. However, the indicator image is reflected by rotatable mirror 16 before the latter is raised and is projected and focussed on viewfinder focussing plane 17 so that the indication can be viewed through the viewfinder. In this arrangement, dating takes place when the mirror 16 has swung upwardly and the focal plane shutter has opened simultaneously therewith as the subject is photographed. Since the exposure for the data display is governed by the exposure time for photographing the subject, the luminance of indicator element 7 is desirably controlled according to the shutter speed. FIG. 7 shows an exemplary control circuit adapted for the aforementioned purpose. This circuit ensures that a sufficient luminance is obtained at the highest shutter speed to prevent underexposure for the dating information. Although overexposure of the dating information is inevitable, that results in no practical disadvantage.

Referring to FIG. 7, decoder 6 includes the components within the chain line. Output transistors T1 to Tn of the decoder are connected to photoelectric diodes L1 to Ln, respectively, of indicator element 7. The bases of transistors T1 to Tn are connected to the outputs of a decoder network (not shown) which receives the output of the counter of the chronometer. The cathodes of photoelectric diodes L1 to Ln are commonly connected to one terminal of the series connection of resistors R1 and R2. The other terminal of resistor R2 is connected to power source E2 through switch S7 which is a manually operable switch for monitoring the data information display within the viewfinder. As switch S7 is closed, current from transistors T1 to Tn flows through photoelectric diodes L1 to Ln to the series-coupled resistors R1 and R2. The sum of the resistances of R1 and R2 is preset to a value such that the photoemission will have a luminance suitable for visual monitoring. The power source E2 is loaded with the series connection capacitor C1 and resistor R3, with C1 being charged to the source voltage of power source E2. A series connection of switches S8 and S9 is interposed between the junction of resistors R1 and R2 and the junction of capacitor C1 and resistor R3. Switch 8 is closed when dating is desired, and switch S9 is closed in timed relation with the motion of the leading shutter curtain and, at the latest, immediately before the leading edge of that curtain traverses the data image on the film. Switch S9 need only remain closed during the travel of the leading curtain. Switches S9 and S7 are opened and closed in mutually staggered relation. Thus, switch S7 must remain open while S9 remains closed. Alternatively, an independent switch operable in opposed timed relation with switch S9 may be connected in series with switch S7. In the dating operation, as switch S9 is closed by the shutter-releasing action, the charged voltage of capacitor C1 and the voltage of power source E2 provide a power supply for the glowing of indicator diodes L1 through Ln. This light-emission current flows only through resistor R1, bypassing resistor R2 so that the indication is accomplished at a sufficiently high level of luminance to give adequate exposure even at high shutter speeds. It is noted that all of photodiodes L1 through Ln do not glow at the same time, as the number of diodes that glow depends upon the data to be indicated. By way of illustration, there is a significant difference in the number of indicator diodes that glow between the calendar data of 1/1/81 (January 1, 1981) and 10/28/81 (October 28, 1981). In this regard, one segment in each digital display corresponds to one of photodiodes L1 to Ln, and because all the indicator current comes through the same resistor R1, there is a difference of about four times in the emission luminance between the above hypothetical indications. However, differences of that order are assimilated by the film so effectively that they entail no problem.

FIG. 5 shows the positioning of indicator element 7 in the projection mechanism of a camera having a lens shutter. 18 represents a half transmission or split mirror. The indication by indicator element 7 is not only visible through eyepiece 19 of the viewfinder but passes through half transmission mirror 18 to be focussed on film F by projection lens 20 and mirror 22. Dating shutter 21, in association with lens shutter 23, is open for a predetermined time independently of the lens shutter speed.

Illustrated in FIG. 8 is an embodiment in which exposure data, e.g., shutter speed or F number, may also be displayed by seven-segment indicator 7 or monitor 7'. This embodiment is applicable to a camera equipped with automatic exposure control of the TTL photometric type. Exposure control circuit 8 includes light measuring circuit 24 adapted to measure the amount of light incident from the subject through the lens and diaphragm (not shown), and A/D conversion circuit 25 which converts the analog output signal of light measuring circuit 24 to a digital output signal. Control circuit 26 is adapted to control the exposure in response to the digital output signal of A/D converter 25. Control circuit 26 automatically sets the exposure time when the diaphragm is preferentially selected and set by the photographer, and automatically sets the diaphragm when the shutter speed is preferentially selected. Control circuit 26 may also be designed so that it will function when it is directly supplied with the analog signal output of light measuring circuit 24.

Light measuring circuit 24, A/D conversion circuit 25 and control circuit 26 are energized through power switch S1, which is closed, for example by the first step of depression of the camera shutter-button (not shown). At that stage, the light measurement and A/D conversion operations are accomplished. Then, as the same shutter-button is further depressed, the measured light value is memorized in A/D conversion circuit 25, the shutter-releasing action takes place and control circuit 26 is excited.

Figure 9:
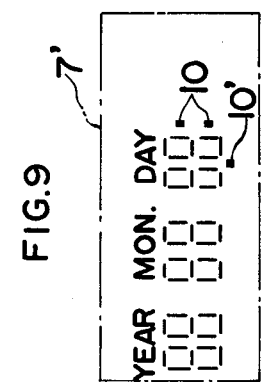
FIG. 9 is a front view showing an example of data indication in the embodiment of FIG. 8.

Switch S10 is adapted to effect a changeover from the indication of calendar data to that of exposure data or vice-versa, and is normally set on contact a. Switch S11 is also normally set on contact a. Therefore, the signal output of A/D conversion circuit 25, which has been converted into binary is transmitted to decoder 6 through AND gate 28, which is set conductive by the contact a of switch 10 attaining a high level, and OR gate 29. When the signal output from A/D conversion circuit 25 has arrived at the decoder 6, the latter controls monitoring indicator element 7' and digital indicator 7 as illustrated in FIG. 9. Thus, exposure data is indicated on monitor 7' upon the first step of depression of the camera shutter-button to close switch S1.

FIG. 9 shows the segments of monitoring indicator element 7' and, below the chain-line block 7', an example each of the F-number (F 5.6) and shutter speed (1/250) indications, which are respectively constituted by the selective emission of light by the segments in indicator element 7'. Reference symbol 10' is a light-emitting element that constitutes a decimal point for the F-number display. A/D conversion circuit 25 transmits to decoder 6 the F-number signal in the shutter preference mode or the shutter speed signal in the diaphragm preference mode.

After shutter release, switch S10 in association with the closing operation of switch S5 is switched to contact b for a predetermined time. Assuming that switch S1 has been closed, the potential across the contact to which S10 has thus been switched attains a high level to render AND gate 27 conductive while the potential across the other contact is low to render AND gate 28 non-conductive. Thus, either AND gate 27 or 28, which receives the high level signal, is conductive. AND gates 27 and 28 receive the calendar data and exposure data, respectively. Either one of those two data is input to decoder 6 by the conductive one of either AND gate 27 or 28 and OR gate 29. Indicators 7 and 7′, which are controlled by decoder 6, are disposed, for example, as shown in FIG. 3.

Depressing a calendar monitor button (not shown) on the camera closes switch S1′ and switches switch S11 to contact b, whereby AND gate 27 is conductive instead of AND gate 28. The calendar information is now transmitted from chronometer 1 to decoder 6, and the calendar data is displayed in the viewfinder by monitoring indicator 7′. Upon release of the calendar monitor button, switch S1′ opens and changeover switch S11 is switched back to contact a.

Now, for photographing, the first stage in the depression of the shutter button closes switch S1 to energize light measuring circuit 24 and A/D conversion circuit 25. The exposure information is input to monitoring indicator 7′ through AND gate 28. As the shutter-button is further depressed, the shutter is released, with exposure being initiated and, in association with the shutter-releasing action, switch S10 is switched to contact b for a predetermined time. Simultaneously therewith switch S5 is closed so that the calendar data is displayed by indicator 7, with its image projected on the film. It is preferable that the display of indicator 7′ be suspended during the exposure. It is also easy to modify the arrangement so that the exposure information may be projected on the film by indicator 7. Of course, it should also be understood that while the connections including the output lines from the counter 5 and A/D conversion circuit 25 to AND gates 27 and 28 are shown by single lines, they are actually plural and that each of the AND gates 27, 28 and OR gate 29 are also plural.

What is claimed is:

1. Dating apparatus for a camera comprising:
    a data source for generating date information signals;
    means for displaying said date information signals to date the camera film;
    decoder means connected between said data source and said displaying means for decoding said date information signals into a signal suitable for displaying; and
    optical means for monitoring the display of said displaying means,
    wherein said displaying means includes means for switching the amount of current flow in the displaying means between a first value for dating the camera film and a second value less than the first value for monitoring.

2. Dating apparatus for a camera having electric circuitry for controlling photography, comprising:
    a crystal oscillator for generating a stable fixed frequency signal output;
    a frequency divider for dividing said fixed frequency signal output to provide a lower frequency signal output;
    counter means for counting said lower frequency output to generate date information signals in synchronization with the actual date;
    a first power source for continuously energizing said crystal oscillator, said frequency divider and said counter means;
    means for displaying the date information signals of the counter means to date the camera film;
    decoder means connected between the counter means and the displaying means for decoding said date information signals into a signal suitable for display;
    a second power source for normally energizing the electric circuitry to control photography and for further energizing said displaying means and said decoder means upon dating the camera film; and
    optical means for monitoring the display of said displaying means, wherein said displaying means includes means for switching the amount of current flow in said displaying means between a first value for dating the camera film and a second value less than the first value for monitoring.

3. Dating apparatus as in claim 2 further comprising means for monitoring said date information signals.

4. Dating apparatus as in claim 3 further comprising first switching means for connecting said means for monitoring to said second power source and second switching means for independently connecting said means for displaying to said second power source for dating the camera film.

5. Dating apparatus as in claim 3 wherein said camera is of the single lens reflex type having an image projecting mechanism including a pentaprism, and wherein said means for displaying is mounted in back of the camera film and said means for monitoring is mounted underneath said pentaprism such that the dating information is viewable in the camera viewfinder.

6. Dating apparatus as in claim 3 wherein said camera further comprises a light measuring circuit, A/D converter means responsive to the output of said light measuring circuit for generating exposure data, and logic circuit means for connecting either the output of said A/D converter or said electronic time signals to said means for decoding whereby either exposure data or said electronic time signals are monitored by said means for monitoring or displayed on said means for displaying.

7. Dating apparatus as in claim 6 further comprising switching means for switching said electronic time signals or said exposure data to said logic circuit means.

8. Dating apparatus as in claim 7 wherein said logic circuit means includes first and second AND gates and an OR gate interconnecting the output of said first and second AND gates to said means for decoding, said switching means including first and second switch means each including first and second positions, the first position of said first switch means interconnecting said first and second switch means in series, the second position of said first switch means providing an input to said first AND gate, said first and second positions of said second switch means providing respective inputs to said second and said first AND gates, said first AND gate having an input responsive to said electronic time signals and said second AND gate having an input responsive to said exposure data, whereby with said first and second switch means in said first positions exposure data is input to said means for decoding, and with said first and second switch means in said second positions said electronic time signals are input to said means for decoding.

9. Dating apparatus as in claim 2, wherein said electric circuitry comprises an exposure control circuit.

10. Dating apparatus as in claim 9 further comprising an auxiliary switch interconnecting said first and second power sources whereby either one of said first or second power sources can be utilized upon failure of the other power source.

11. Dating apparatus as in claim 9, wherein said camera further comprises a mirror movable from a viewing position to a picture taking position, a pentaprism and a viewfinder, and means for projecting the dating information in said means for displaying onto said mirror in the viewing position thereof for observance of the image in said viewfinder and for projecting said dating information in said means for displaying onto said film with said mirror in said picture taking position.

12. Dating apparatus as in claim 9 wherein said camera is of the lens shutter type and includes a viewfinder and means for projecting the dating information in said means for displaying into said viewfinder and onto a designated portion of the camera film, said projecting means including a split mirror and optical projection means whereby the image of the dating information in said means for displaying is projected by said split mirror into said eyepiece and said optical projection means for simultaneous observation of the dating information and dating of said film.

13. Dating apparatus as in claim 2, wherein said electric circuitry comprises an exposure control circuit and indicating means normally responsive to the output of said exposure control circuit for indicating exposure information, said indicating means also monitoring said date information signals.

14. Dating apparatus as in claim 2, wherein said displaying means includes a capacitor connected in parallel with said second power source for storing power for dating the camera film.

15. Dating apparatus as in claim 14, wherein said displaying means includes a plurality of light emitting diodes to be energized by said capacitor.

16. Dating apparatus for a camera, comprising;
a first power source;
chronometer means energized by said first power source for generating electronic time signals;
means for decoding said electronic time signals into date information signals;
means for displaying the date in accordance with said date information signals;
a second power source for energizing said displaying means to date the camera film;
said means for decoding includes a plurality of driving means each responsive to said electronic timing signals, and said means for displaying includes a like plurality of photoelectric indicator elements each respectively connected to a respective one of said plurality of driving means, resistance means connected to said plurality of photoelectric indicator elements, and switching means for connecting said resistance means to said second power source for energizing said means for displaying, said resistance means is a resistance divider network; and
further comprising a series-connected capacitor and power supply resistance connected in parallel to said second power source, said switching means includes first and second independently operable series-connected switches interconnecting the junction of said resistance divider and said series-connected capacitor and power supply resistance, and a third switching means interconnecting the other terminal of said resistance divider network and said power supply resistance, manual closure of said third switching means actuating said photoelectric indicator elements for monitoring said electronic timing signals, and said first switching means being closed in timed relation with the shutter operaton of said camera and manual closure of said second switch and opening of said third switch effecting dating of the camera film.

17. Dating apparatus for a camera, comprising:
a first power source;
chronometer means energized by said first power sources for generating electronic time signals;
means for decoding said electronic time signals into date information signals;
means for displaying the date in accordance with said date information signals;
a second power source for energizing said displaying means to date the camera film;
means for monitoring said date information signals;
a light measuring circuit, A/D converter means responsive to the output of said light measuring circuit for generating exposure data, and logic circuit means for connecting either the output of said A/D converter or said electronic time signals to said means for decoding whereby either exposure data or said electronic time signals are monitored by said means for monitoring or displayed on said means for displaying;
switching means for switching said electronic time signals or said exposure data to said logic circuit means;
said logic circuit means includes first and second AND gates and an OR gate interconnecting the output of said first and second AND gates to said means for decoding, said switching means including first and second switch means each including first and second positions, the first position of said first switch means interconnecting said first and second switch means in series, the second position of said first switch means providing an input to said first AND gate, said first and second positions of said second switch means providing respective inputs to said second and said first AND gates, said first AND gate having an input responsive to said electronic time signals and said second AND gate having an input responsive to said exposure data, whereby with said first and second switch means in said first positions exposure data is input to said means for decoding, and with said first and second switch means in said second positions said electronic time signals are input to said means for decoding.

18. Dating apparatus as in claim 17 further comprising a fourth switch means ganged with said first switch means and interconnecting said second power source to said first switch means, said means for decoding and said means for monitoring, whereby actuation of said fourth switch means switches said first switch means from said first to said second position such that said timing data is input to said means for decoding and is observable in said means for monitoring.

* * * * *